United States Patent [19]

Awaji

[11] Patent Number: 5,514,205
[45] Date of Patent: May 7, 1996

[54] APPARATUS FOR REMOVING HARMFUL OBJECTS FROM A GAS

[76] Inventor: Toshio Awaji, 4-130-banchi, Hikino-cho 2-cho, Sakai-shi, Osaka-fu, Japan

[21] Appl. No.: 366,654

[22] Filed: Dec. 30, 1994

[51] Int. Cl.⁶ .................................................. B01D 53/04
[52] U.S. Cl. ................. 96/152; 96/139; 55/516; 55/518
[58] Field of Search ................ 96/108, 121, 130–134, 96/139–141, 152; 55/515–519

[56] References Cited

U.S. PATENT DOCUMENTS

| | | | |
|---|---|---|---|
| 2,043,298 | 6/1936 | Markels | 55/519 X |
| 3,685,971 | 8/1972 | Carson | 96/152 X |
| 4,306,894 | 12/1981 | Fukami et al. | 96/131 |
| 4,448,594 | 5/1984 | Kozawa | 96/130 |
| 4,478,619 | 10/1984 | Arends et al. | 96/132 |
| 4,581,047 | 4/1986 | Larsson | 96/131 |
| 4,636,315 | 1/1987 | Allen, Jr. | 96/152 X |
| 4,714,486 | 12/1987 | Silverthorn | 96/134 |
| 4,717,401 | 1/1988 | Lupoli et al. | 96/141 |
| 4,750,923 | 6/1988 | Haruta et al. | 96/141 |
| 4,750,999 | 6/1988 | Roberts et al. | 96/152 X |

FOREIGN PATENT DOCUMENTS

| | | | |
|---|---|---|---|
| 1-015118 | 1/1989 | Japan | 96/152 |
| 1813525 | 5/1993 | U.S.S.R. | 96/108 |

*Primary Examiner*—Robert H. Spitzer
*Attorney, Agent, or Firm*—Edwin E. Greigg; Ronald E. Greigg

[57] ABSTRACT

An apparatus for removing harmful objects comprising a cylindrical casing having an inlet and an outlet, a fill-up section for a granular or lump treating material for adsorbing or resolving the harmful objects. An inlet obstructive plate provided within the casing and spaced from the inlet for covering the area corresponding to the inlet from the inside of the casing. A surrounding obstructive plate provided in at least an upper portion of the fill-up section among the upper portion, a middle portion between the top and bottom and a lower portion thereof to project into the fill-up section from the interior of the casing and a supporting plate for supporting the treating material.

10 Claims, 2 Drawing Sheets

APPARATUS FOR REMOVING HARMFUL OBJECTS FROM A GAS

BACKGROUND OF THE INVENTION (1) Field of the Invention

The present invention relates to an apparatus for effectively removing harmful objects, which are included in a gas which is, for example, produced in a process of manufactuirng a semiconductor element.

(2) Prior Art

Recently, computers and electric control devices utilizing the computers have been progressed remarkably, and it seems that development of these industries expands widely and infinitely. Now, technique in manufacturing semiconductors, which lakes an important position as electronic parts used for a computer, and also the gross of its production are growing remarkably and rapidly.

Germanium (Ge) and silicon (Si) are normally used as raw materials for the semiconductor elements, and as a special semiconductor element, gallium-arsenic (GaAs) and gallium-phosphorus (GAP) and the like are utilized.

The processes for manufacturing semiconductor elements comprises, for example, a column forming process for forming a column of the semiconductor, a wafer forming process for slicing the column of the semiconductor, an element forming process for forming a number of elements by repeating the processes of masking the wafer, forming a thin film thereon, doping and etching the same, and a cutting process for cutting the treated wafer into each of the elements.

In the manufacturing processes, it is known that very fine particle dust such as 0.01–50 μm is generated. It is also known that such fine particle dust is sometimes a harmful object which is prohibited to be abandoned in view of prevention of enviromental pollution, arid the gas itself including such a fine particle dust is a harmful object. Further, the fine particle dust sometimes absorbs or adsorbs a harmful object.

The harmful objects generated or used in the semiconductor manufacturing are such as silicon, arsenic, phosphorus, boron, metallic hydrogen, fluorine, halogen, halide, nitrogen oxides and the like, which will be referred to below.

As the silicon harmful gas, it may typically cite monosilane ($SiH_4$), dichlorosilane ($SiHCl_2$), silicon trichloride ($SiHCl_3$), silicon tetrachloride ($SiHCl_4$), silicon tetrafluoride ($SiF_4$), disilane ($Si_2H_6$), or TEOS($Si(OC_2H5)_4$).

As the arsenic harmful gas, it may represent: arsine ($AsH_3$), arsenic fluoride (III)($AsF_3$), arsenic fluoride (V)($AsF_5$), arsenic chloride (III) ($AsCl_3$), or arsenic chloride (V) ($AsCl_5$).

As the phosphorus harmful gas, it may represent phosphine ($PH_3$), phosphorus fluoride (III) ($PF_3$), phosphorus fluoride (V) ($PF_5$), phosphorus chloride (III) ($PCl_3$), phosphorus chloride (V) ($PCl_5$), or phosphorus oxychloride ($POCl_3$).

As the boron harmful gas, it may cite diborane ($B_2H_6$), boron trifluoride ($BF_3$), boron trichloride ($BCl_3$), or boron tribromide ($BBr_3$).

As the metallic hydrogen harmful gas, it may list up hydrogen selenide ($H_2Se$), monogermane ($GeH_4$), hydrogen telluride ($H_2Te$), stibine ($SbH_3$), or hydrogen tin ($SnH_4$).

As the fluorine harmful gas, it may, for example, cite methane tetrafluoride ($CF_4$), methane trifluoride ($CHF_3$), methane difluoride ($CH_2F_2$), propane sixfluoride ($C_3H_2F_6$), propane octafluoride ($C_3F_8$).

As the harmful gas of halogen and halide, fluorine ($F_2$), hydrogen fluoride (HF), chlorine ($Cl_2$), hydrogen chloride (HCl), carbon tetrachloride ($CCl_4$), hydrogen bromide (HB), nitrogen trifluoride ($NF_3$), sulfur tetrafluoride ($SF_4$), sulfur sixfluoride ($SF_6$), tungsten sixfluoride (VI) ($WF_6$), molybdenum sixfluoride (VI) ($MoF_6$), germanium tetrachloride ($GeCl_4$), tin tetrachloride ($SnCl_4$)), antimony pentachloride (V) ($SbCl_5$), tungsten sixchloride (VI) ($WCl_6$) or molybdenum sixchloride (VI)($MoCl_6$).

As the harmful gas of nitrogen oxides, it may cite nitrogen monoxide (NO), nitrogen dioxide ($NO_2$), or dinitrogen oxide ($N_2O$), and as the other harmful gas, it may also cite hydrogen sulfide ($H_2S$), ammonia ($NH_3$), and trimethylamine ($CH_3)_3N$.

Further, it is known that fine particle dust may be produced in such a gas including ethane ($C_2H_5$), propane ($C_3H_8$), which have inflammability, and nitrogen ($N_2$), oxygen ($O_2$), argon (Ar), nitrogen dioxide ($NO_2$) and the like.

Nowadays, the mind of preventing a public nuisance is thoroughly permeated. In such a state, it cannot accept to directly discharge the exhaust gas including the above harmful components or fine particle dust into the air, and it is required to give a suitable treatment to the exhaust gas so as to change the harmful gas to be a safe and clean gas. Therefore, as shown in FIG. 4, the exhaust gas is filtered out from an exhaust gas generator 1 by means of a pump 2 and fine particle dust of the exhaust gas is removed by a dust collector 3, and then a harmful component removing device 4 gives the gas a treatment of oxidation, reduction, adsorption or absorption.

As the dust collector, it may use a well known dust collector such as cyclone, a scrubber, a venturi scrubber, a bag filter, an electric collector, a looper and a settler. However, it is preferable to use an apparatus for treating a very fine particle dust, which is the prior invention (Japanese patent application No. 5-113927) of this applicant. This apparatus has high ability of collecting a dust and needs a small area of collecting.

The above apparatus for removing a harmful object uses, as shown in FIG. 5, a cylindrical casing 101 in which a harmful object treating material 102 is filled. The casing 101 has an inlet 103 at the lower end thereof and an outlet 104 at the upper end thereof, and also provides a supporting frame 105 which is fixed to the lower portion of the interior of the casing.

Further, the supporting frame 105 provides a supporting plate 106 which comprises a punched metal, and the supporting plate 106 supports the harmful treating material 102.

The harmful treating material 102 comprises, for example, a granular or lumpish base element having a diameter of 5–18 mm, and a harmful treating material. As the base element, it may cite, for example, active carbon, ceramics, plastics and the like, and as the harmful treating material, it may frequently use a platinum catalyst, an alkali metal silicate or a metal phosphate.

In the conventional apparatus for removing a harmful object, the exhaust gas including a harmful component easily flows in the area (the area shown with hatching of small pitch in FIG. 5), which flows to the outlet 104 straight from the inlet 103 of the casing 101, since a passage 108 may be formed in the area. However, since the passage 108 is narrow, its removing effect becomes low and the harmful treating material 102 around the passage 108 almost never functions and the ability of removing the harmful object becomes low in a short time. Thus, it has a disadvantage that the expected life span of the apparatus becomes short.

Further, in the conventional apparatus for removing the harmful object, it has been tried to control the exhaust gas to flow through the passage 108 with the function of atmospheric pressure by providing the inlet 103 at the lower end of the casing 101 and also the outlet 104 at the upper end thereof, so that the exhaust gas may sufficiently contact the harmful treating material 102 which is positioned outside the passage 108 in the casing 101. However, since the exhaust gas is urged by the pressure of the pump 2, such an idea almost never influences the efficiency of removing the harmful objects.

Furthermore, since the supporting plate 106 supporting the harmful treating material is constructed by a punched metal, the exhaust gas cannot flow at the portions of the harmful treating material which correspond to the portion of the supporting plate 106 where the punched openings are not located. Since the harmful treating material in the granular or lump form contacts the punched openings and closes same, the efficiency of utilizing the harmful treating material becomes low. Therefore, it is very disadvantageous in increasing not only the efficiency of using the harmful treating material, but also the expected life span of the apparatus.

SUMMARY OF THE INVENTION

The present invention has an object to provide an apparatus for removing harmful objects which may realize an increase of the efficiency of using a harmful treating material, a high ability of treatment and the long life span of the apparatus, by constructing the apparatus in such a state that the harmful objects included in the gas produced or generated in the processes of manufacturing semiconductor elements, may effectively contact the entire area of a harmful treating material which is filled in a casing.

To achieve the above object, the apparatus for removing the harmful objects according to the present invention adopts the following technical means.

Namely, the first apparatus for removing the harmful objects according to the invention comprises a cylindrical casing having an inlet at an end thereof and an outlet at another end thereof, a fill-up section for a granular or lump treating material for adsorption or resolving harmful objects, an inlet obstructive plate provided at the inlet for covering the inlet from the inside of the casing, and a surrounding obstructive plate provided in at least an upper portion of the fill-up section among the upper portion, a middle portion between the top and bottom and a lower portion thereof to project into the fill-up section from the interior of the casing.

The second apparatus for removing the harmful objects according to the invention comprises a cylindrical casing having an inlet at an end thereof and an outlet at another end thereof, a fill-up section for a granular or lump treating material for adsorbing or resolving harmful objects, and a supporting plate disposed at a lower portion of the casing to support the harmful treating material, said supporting plate being provided with a punched plate and a frame projecting from an upper surface of the punched plate upwardly.

The third apparatus for removing the harmful objects according to the invention comprises a cylindrical casing having an inlet at an end thereof and an outlet at another end thereof, a fill-up section for a granular or lump treating material for adsorbing or resolving harmful objects, an inlet obstructive plate provided at the inlet for covering the inlet from the inside of the casing, and a supporting plate disposed at a lower portion of the casing to support a harmful treating material, said supporting plate being provided with a punched plate and a frame projecting from an upper surface of the punched plate upwardly.

The fourth apparatus for removing the harmful objects according to the invention comprises a cylindrical casing having an inlet at an end thereof and an outlet at another end thereof, a fill-up section for a granular or lump treating material for adsorbing or resolving harmful objects, a surrounding obstructive plate provided in at least an upper portion of the fill-up section among the upper portion, a middle portion between the top and bottom and a lower portion thereof to project into the fill-up section from the interior of the casing, and a supporting plate disposed at a lower portion of the casing to support a harmful treating material, said supporting plate being provided with a punched plate and a frame projecting from an upper surface of the punched plate upwardly.

The fifth apparatus for removing the harmful objects according to the invention comprises a cylindrical casing having an inlet at an end thereof and an outlet at another end thereof, a fill-up section for a granular or lump treating material for adsorption or resolving a harmful objects, an inlet obstructive plate provided at the inlet for covering the inlet from the inside of the casing, a surrounding obstructive plate provided in at least an upper portion of the fill-up section among the upper portion, a middle portion between the top and bottom and a lower portion thereof to project into the fill-up section from the interior of the casing, and a supporting plate disposed at a lower portion of the casing to support a harmful treating material, said supporting plate being provided with a punched plate and a frame projecting from an upper surface of the punched plate upwardly.

The sixth apparatus for removing the harmful object according to the invention is constructed the same as each of the above mentioned apparatus except the following construction. Namely, it provides an inlet at an end of the casing and an outlet at the same end of the casing instead of providing the inlet at the end of the casing and the outlet at the other end of the casing, and also provides a passage which communicates with the side of the outlet of the fill-up section and the outlet of the end of the casing.

To clarify the present invention, it will be described in detail as follows.

The inlet of the apparatus for removing the harmful objects according to the present invention is connected to a source for generating or producing an exhaust gas including harmful objects.

It is considered that the source of producing the harmful objects may be any kind of sources and not limited specifically. For instance, as typical sources, there are a treatment chamber for growing a vapor phase, a plasma treatment chamber for growing a vapor phase in the process of forming a column of semiconductor in semiconductor manufacturing, a treatment chamber of forming a thin film, a doping treatment chamber, an etching treatment chamber, a treatment chamber for plasma etching, each being used in the process of forming semiconductor elements, and a washing treatment chamber used in each of the above mentioned processes or between each of these processes.

It is preferable to connect the inlet of the apparatus directly to the source for producing the harmful objects, but it is also preferable to connect the inlet to the apparatus via a dust collector in order to prevent the punched openings from being clogged due to dust or the dust having the harmful objects from passing through the apparatus.

Regarding the dust collector, its detailed description is omitted here since the present invention does not relate to the dust collector itself.

The outlet of the apparatus may be directly communicated with the air, but it may communicate with the air via another apparatus for removing the harmful objects or a silencer.

It is sufficient that the casing takes a cylindrical shape, and its cylindrical shape may be, for example, square, hexagonal, octagonal, multiangular or elliptical. However, it is preferable to form the casing to be a cylindrical shape which exposes the harmful treating material equally in all directions from an axis thereof so as to permit deterioration of the harmful treating material equally. Further, it is preferable to arrange the inlet and the outlet to be coaxial with the casing.

The material of the casing is not limited specifically, but it is preferable to use such a material which has airtightness, chemical resistance, acid resistance, alkali resistance, weather resistance and mechanical strength. It may use such material as fiber-reinforced plastics, metals such as an iron with anticorrosion treatment such as rubber lining and a steel including a stainless steel. Among them, it is preferable to frequently use, for example, the stainless steel which is easy in cleaning the outside or inside of the casing or unnecessitates such a treatment.

It is sufficient to use the harmful treating material which is used conventionally. For instance, it may use one which comprises a granular or lump base material supporting a treating agent.

As the base material, it may use one which has no ability for adsorbing or absorbing the harmful objects. However, it is preferable to use one which has ability of adsorbing or absorbing the harmful objects in order to increase its treating efficiency. As the base material which has an ability of adsorption or absorbing the harmful objects, it may use active carbon, ceramics, zeolite, alumina, acid clay and so forth.

Further, as the base material, it may use a treating agent, which is formed to be granular or lump. The treating agent will be referred to below.

As the treating agent, it may use metallic phosphate, amine silicate, alkaline metallic silicate and platinum catalyst.

As another treating agent, it may list as follows.

Namely, there are oxides belonging to a group I, II, III or IV in a periodic table, such as NaO, $K_2O$, CaO, MgO, CuO, $Ag_2O$, alumina, zirconium oxide or those in a compound including the said oxides which are shown with $(Mc_1)x(Mc_2)y(O)z$. $Mc_1$ is the element belonging to a group I, II or III, and $Mc_2$ is a group III of such as aluminium (Al), a group IV of such as carbon (C), silicon (Si), titanium (Ti), and zirconium (Zr), or a group V of such as phosphorus (P) and vanadium (V). The above mentioned O is oxide and x, y, z are integral numbers.

In the first apparatus of the present invention, a suitable clearance is arranged between the inlet of the casing and the fill-up section of the treating material and the inlet obstructive plate is arranged leaving a suitable distance from the inlet and the fill-up section, and also the surrounding obstructive plate is provided in at least an upper portion of the fill-up section among the upper portion, a middle portion between the top and bottom and a lower portion thereof to project into the fill-up section from the interior of the casing.

The inlet obstructive plate is neccessary to cover the inlet of the casing from the inside, but it is not neccessary to cover the inlet entirely and it is sufficient to form the plate in a size for dispersing the flow of the exhaust gas from a center of the casing.

Further, the shape of the inlet obstructive plate is not limited specifically, but it is possible to form the plate in the shape of a star, multiangles or ellipse where these are seen from the side of the inlet. However, it is preferable to form the plate in a shape of circles which are coaxial with the inlet in order to disperse the exhaust gas evenly.

Furthermore, it is possible to use a solid plate such as a conical shape or a chryanthemum-shaped metal fixture as the inlet obstructive plate, but it is preferable to form the plate with a flat plate in order to reduce the manufacturing cost by simplifying its shape.

Since the inlet obstructive plate covers the inlet from the inside, the exhaust gas including the harmful objects may be dispersed widely in the upper portion of the fill-up section and prevented from passing only the specific portion of the treating material, so that its efficiency of removing the harmful objects may be improved.

By the way, since the interior of the casing is smooth, it tends to form a passage having a small flow resistance between the interior of the casing and the harmful object treating material rather than the passage formed in the harmful object treating material where the harmful object treating material is formed in such a shape that such a passage of small flow resistance may be easily formed. As the result, the exhaust gas flows between the interior of the casing and the harmful object treating material having a small flow resistance, and its treating efficiency goes down and the peripheral portion of the fill-up section of the treating material may sometimes be broken easily within a short period of time.

Then, the first apparatus of the present invention provides the surrounding obstructive plate in at least an upper portion of the fill-up section among the upper portion, a middle portion between the top and bottom and a lower portion thereof to project into the fill-up section from the interior of the casing.

In this case, it is preferable to dispose the surrounding obstructive plate to be inclined from the base end thereof toward the tip end thereof so as to control the flow of the exhaust gas toward the inside of the treating material.

Further, since the supporting plate supporting the harmful object treating material is a punched metal, the exhaust gas never flows into the portions thereof which correspond to the portions of the plate which are not punched. Furthermore, since the punched openings tend to be closed in direct contact with fine particles or lumps of the treating material, an efficiency of utilizing the harmful object treating material becomes low and therefore it is disadvantageous in not only increasing its efficiency, but also extending the expected life time of the apparatus.

Then, the second apparatus of this invention provides the supporting plate disposed at a lower portion of the casing to support the harmful treating material, said supporting plate being provided with the punched plate and the frame projecting from an upper surface of the punched plate upwardly.

The fill-up section for the treating material is supported to be floatable from the punched plate by means of the frame. Therefore, the greater portion of the passage formed in the fill-up section is not closed with the unpunched portion of the punched plate, and then opened between the clearances or meshes of the frame and gathered (effect of gathering passages), so that the flow-in of the exhaust gas into the fill-up section or the flow-out of the exhaust gas from the fill-up section cannot be blocked partly. As the result, the exhaust gas can be evenly flown through the entire fill-up section.

Further, the height of the frame should be determined to support the harmful object treating material leaving a distance from the punched plate and therefore it is preferable to set the height of the frame to be 3–30 mm and preferably 5–15 mm. Where the height of the frame is set to be less than 3 mm, it will be neccessary to form the clearances or meshes of the frame to be smaller. However, such a construction may increase the flow resistance of the passage.

By the way, the third apparatus of the invention particularly provides the inlet obstructive plate provided at the inlet for covering the inlet from the inside of the casing, and the supporting plate disposed at a lower portion of the casing to support a harmful treating material, said supporting plate being provided with the punched plate and the frame projecting from an upper surface of the punched plate upwardly.

Namely, the apparatus provides the inlet obstructive plate and the supporting plate arranged at the lower portion of the casing for supporting the harmful object treating material, and the supporting plate comprises the punched plate and the frame projecting upwardly from the punched plate. In combination of these elements, the exhaust gas including the harmful object can be flow through the entire fill-up section for the harmful object treating material, so that an efficiency of utilizing the treating material may be increased. As the result, the high ability of the apparatus for treating the exhaust gas can be obtained and its life span of time may be extended.

In the third apparatus, as the inlet obstructive plate and the supporting plate, the above mentioned one may be used.

Further, in the fourth apparatus of the invention, it particularly provides the surrounding obstructive plate provided in at least an upper portion of the fill-up section among the upper portion, a middle portion between the top and bottom and a lower portion thereof to project into the fill-up section from the interior of the casing, and the supporting plate disposed at a lower portion of the casing to support a harmful treating material, said supporting plate being provided with a punched plate and a frame projecting from an upper surface of the punched plate upwardly.

Namely, the, apparatus provides the surrounding obstructive plate and the supporting plate arranged at the lower portion of the casing for supporting the harmful object treating material, and the supporting plate comprises the punched plate and the frame projecting upwardly from the punched plate. In combination of these elements, the exhaust gas including the harmful objects can flow through the entire fill-up section for the harmful object treating material, so that an efficiency of utilizing the treating material may be increased. As the result, the high ability of the apparatus for treating the exhaust gas can be obtained and its life span of time may be extended.

In the fourth apparatus, as the surrounding obstructive plate and the supporting plate, the above mentioned one may be used.

As the fifth apparatus of the invention, it particularly provides the inlet obstructive plate provided at the inlet for covering the inlet from the inside of the casing, the surrounding obstructive plate provided in at least an upper portion of the fill-up section among the upper portion, a middle portion between the top and bottom and a lower portion thereof to project into the fill-up section from the interior of the casing, and the supporting plate disposed at a lower portion of the casing to support a harmful treating material, said supporting plate being provided with a punched plate and a frame projecting from an upper surface of the punched plate upwardly.

Namely, the apparatus provides the inlet obstructive plate, the surrounding obstructive plate provided in at least an upper portion of the fill-up section among the upper portion, a middle portion in top and bottom and a lower portion thereof to project into the fill-up section from the interior of the casing, and the supporting plate arranged at the lower portion of the casing for supporting the harmful object treating material, and the supporting plate comprises the punched plate and the frame projecting upwardly from the punched plate. In combination of these elements, the exhaust gas including the harmful objects can flow through the entire fill-up section for the harmful object treating material, so that an efficiency of utilizing the treating material may be increased. As the result, the high ability of the apparatus for treating the exhaust gas can be obtained and its life span of time may be extended.

In the fifth apparatus, as the inlet obstructive plate, the surrounding obstructive plate and the supporting plate, the above mentioned one may be used.

As the sixth apparatus of the invention, in each of the above mentioned apparatuses, it particularly provides the inlet at an end of the casing and the outlet at the same end of the casing instead of providing the inlet at the end of the casing and the outlet at the other end of the casing, and also provides the passage which communicates with the side of outlet of the fill-up section and the outlet of the end of the casing. In combination of these elements, it may obtain the advantages which are obtained in each of the above mentioned apparatuses and in addition to these advantages it is possible to minimize the area of installation of the apparatus and to easily install each of the apparatuses.

ADVANTAGES

The first apparatus of removing the harmful object according to the invention has advantages of increasing an efficiency of utilizing the harmful object treating material and obtaining a high ability of treatment and a long life span of the apparatus. Because, the exhaust gas including the harmful objects may flow through the entire fill-up section for the treating material so as to effectively contact the exhaust gas and the harmful object treating material by providing the inlet obstructive plate and the surrounding obstructive plate provided in at least an upper portion of the fill-up section among the upper portion, a middle portion between the top and bottom and a lower portion thereof to project into the fill-up section from the interior of the casing.

The second apparatus of removing the harmful object according to the invention has the following advantages. Namely, since the apparatus provides the supporting plate for the harmful object treating material arranged at the lower portion of the casing and the supporting plate comprises the punched plate and the frame projecting upwardly from the punched plate, the greatest portion of the passage formed in the fill-up section is not closed with the unpunched portion of the punched plate, and then opened between the clearances or meshes of the frame and gathered (effect of gathering passages), so that the flow-in of the exhaust gas into the fill-up section or the flow-out of the exhaust gas from the fill-up section cannot be blocked partly. As the result, the exhaust gas can evenly flow through the entire fill-up section, so as to increase an efficiency of utilizing the harmful object treating material and obtaining a high ability of treatment and a long life, span of the apparatus.

The third apparatus of removing the harmful objects according to the invention has the following advantages. It particularly provides the inlet obstructive plate at the inlet of the casing to cover the inlet from the inside and the supporting plate comprising the punched plate and the frame projecting upwardly from the punched plate. As the result, the exhaust gas including the harmful objects flow through the entire fill-up section for the treating material so as to effectively contact the exhaust gas and the harmful object treating material, so as to increase an efficiency of utilizing the harmful object treating material and obtaining a high ability of treatment and a long life span of the apparatus.

The fourth apparatus of removing the harmful object according to the invention has the following advantages. Namely, it particularly provides the surrounding obstructive plate provided in at least an upper portion of the fill-up section among the upper portion, a middle portion between the top and bottom and a lower portion thereof to project in to the fill-up section from the interior of the casing, and also the supporting plate disposed at a lower portion of the casing to support a harmful treating material, said supporting plate being provided with a punched plate and a frame projecting from an upper surface of the punched plate upwardly. As the result, the exhaust gas including the harmful objects flow through the entire fill-up section for the treating material so as to effectively contact the exhaust gas and the harmful object treating material and to increase an efficiency of utilizing the harmful object treating material and obtaining a high ability of treatment and a long life span of the apparatus.

The fifth apparatus of removing the harmful object according to the invention has the following advantages. It particularly provides the inlet obstructive plate provided at the inlet for covering the inlet from the inside of the casing, the surrounding obstructive plate provided in at least an upper portion of the fill-up section among the upper portion, a middle portion between the top and bottom and a lower portion thereof to project into the fill-up section from the interior of the casing, and the supporting plate disposed at a lower portion of the casing to support a harmful treating material, said supporting plate being provided with a punched plate and a frame projecting from an upper surface of the punched plate upwardly. As the result, the exhaust gas including the harmful objects flow through the entire fill-up section for the treating material so as to effectively contact the exhaust gas and the harmful object treating material, so as to increase an efficiency of utilizing the harmful object treating material and obtaining a high ability of treatment and a long life span of the apparatus.

The sixth apparatus of the invention has the following advantages. Namely, in each of the above mentioned apparatuses, it particularly provides the inlet at an end of the casing and the outlet at the same end of the casing instead of providing the inlet at the end of the casing and the outlet at the other end of the casing, and also provides the passage which communicates with the side of outlet of the fill-up section and the outlet of the end of the casing. As the result, it may obtain not only the advantages which are obtained in each of the above mentioned apparatuses, but also advantages of minimizing the area of installation of the apparatus and easily installing each of the apparatuses by setting the apparatuses on the setting surface.

Other advantages of this invention will be apparent from the description of the embodiment with reference to the drawings.

BRIEF DESCRIPTION OF THE DRAWINGS

The drawings show embodiments of an apparatus of removing a harmful object according to the present invention in which.

DETAILED DESCRIPTION OF THE PREFERRED EMBODIMENTS

The apparatus for removing harmful objects according to the present invention will be described in detailed with reference to the drawings, but the invention is not limited to the embodiment.

Figure 1:
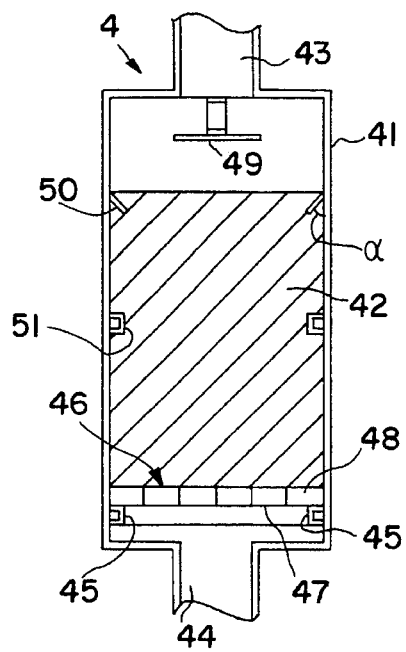
FIG. 1 is a sectional view of the apparatus.
Figure 2:
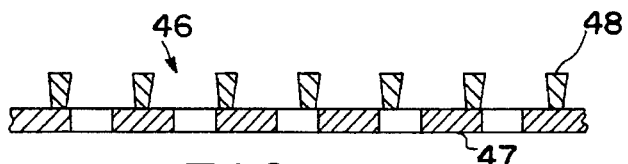
FIG. 2 is an enlarged sectional view of a supporting plate of the apparatus.

In FIGS. 1 and 2, a harmful object treating material 42 is filled up in a casing 41 or the apparatus. The casing 41 has an inlet 43 at the upper end thereof and an outlet 44 at the lower end thereof, and the inlet 43 is connected to a source of generating harmful objects which produces an exhaust gas including the harmful objects.

It should be noted that the source of producing the harmful objects may be any kind of sources and not limited specifically. For instance, as the typical sources, there are a treatment chamber for growing a vapor phase, a plasma treatment chamber for growing a vapor phase in the process of forming a column of semiconductor in semiconductor manufacturing, a treatment chamber of forming a thin film, a doping treatment chamber, an etching treatment chamber, a treatment chamber for plasma etching, each being used in the process of forming semiconductor elements, and a washing treatment chamber used in each of the above mentioned processes or between each of these processes.

It is possible to connect the inlet of the apparatus directly to the source of producing the harmful object, but it is preferable to connect the inlet to the apparatus via a dust collector in order prevent the punched openings from obstructing due to dust or the dust having the harmful object from passing through the apparatus.

Figure 4:
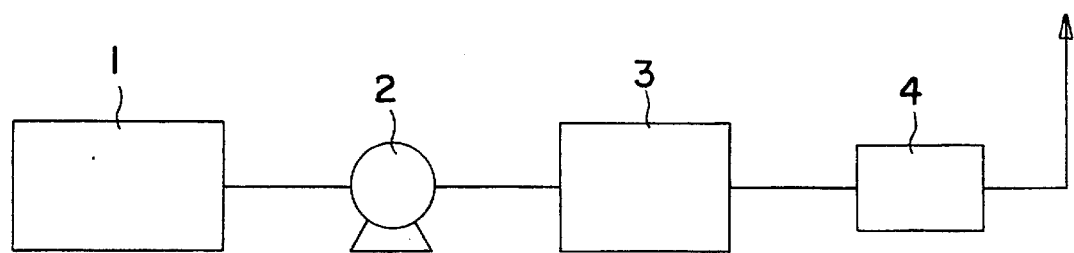
FIG. 4 is a schematic view of a system for removing harmful objects to which the present invention as well as the conventional apparatus may be adopted.
Figure 5:
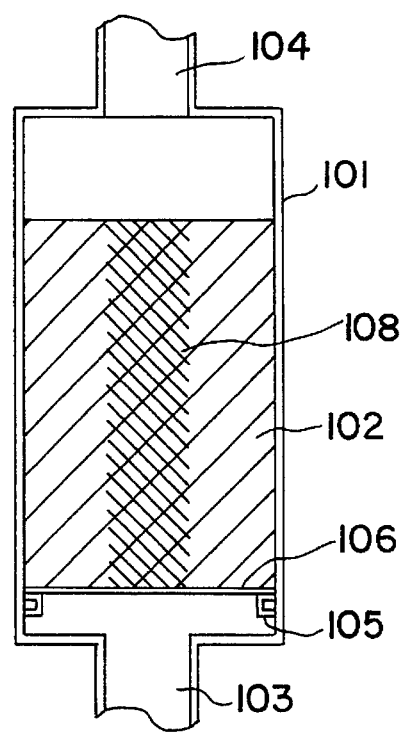
FIG. 5 is a sectional view of an apparatus for removing a harmful object according to the prior art.

Therefore, the inlet 43 of the apparatus 4 is, for example, connected to the source 1 of generating the harmful objects via a dust collector 3 and a pump 2, as shown in FIG. 4.

The outlet 44 of the apparatus 4 may be communicated with the air via another apparatus of removing a harmful object, but in this embodiment, the outlet 44 is directly communicated with the air since the apparatus 4 has obtained a sufficient effect of removing the harmful objects without provision of a further apparatus.

It is sufficient that the casing 41 takes a cylindrical shape, and its cylindrical shape may be, for example, square, hexagonal, octagonal, multiangular or elliptical. However, it is preferable to form the casing 41 to be a cylindrical shape which is equal in all directions from an axis thereof so as to permit deterioration of the harmful treating material 42 equally. Further, the inlet 43 and the outlet 44 are arranged to be coaxial with the casing 41.

The material of the casing is not limited specifically, but it is preferable to use such a material which has airtightness, chemical resistance, acid resistance, alkali resistance, weather resistance and mechanical strength. For instance, it may use such as fiber-reinforced plastics, metals such as an iron with anticorrosion treatment such as rubber lining and a steel including a stainless steel. Among them, this embodiment uses the stainless steel which is easy in cleaning the outside or inside of the casing or unneccessitates such a treatment.

A supporting frame 45 is fixed Lo the lower portion of the interior of the casing 41, for reinforcing the casing 41, and a supporting plate 46 is supported by the supporting frame As shown in FIG. 2 of the enlarged sectional view, the supporting plate 46 comprises a punched plate 47 and a frame 48 which is fixed onto the upper surface of the punched plate 47.

The frame 48 should be formed to support the harmful object treating material 42 in such a state that the material 42 is remote from the punched plate 47, and therefore the mesh of the frame 48 should be smaller than the particle of the harmful object treating material 42. In this case, the mesh of the frame 48 is set to be about 1–12 mm. It is possible to forte the frame 48 to be a lattice in plan view, but this embodiment adopts a stripe pattern for the frame 48 in order to reduce its manufacturing cost and to simplify its construction.

Further, the height of the frame 48 should be determined to support the harmful object treating material 42 leaving a distance from the punched plate 47 and therefore it is preferable to set the height of the frame to be 3–30 mm. Where the height of the frame is set to be less than 3 mm, it will be neccessary to form the clearances or meshes of the frame to be small. However, such a construction may increase the flow resistance of the passage. Contrary to this, where the height of the frame 48 exceeds 30 mm, the effect of gathering flow passages reaches the maximum and no further effect is expected and such a construction merely increases its manufacturing cost.

It is sufficient to use the harmful treating material which is used conventionally. For instance, it may use one which comprises a granular or lump base material supporting a treating agent.

As the base material, it may use one which has not ability of adsorption or absorbing the harmful object. However, it is preferable to use one which has an ability of adsorption or absorbing the harmful object in order to increase its treating efficiency.

As the base material which has an ability of adsorption or absorbing the harmful object, it may comprise active carbon, ceramics, zeolite, alumina, acid clay and so forth.

Further, as the base material, it may use a treating agent, which is formed to be granular or lump.

As the treating agent, it may normally use metallic phosphate, amino silicate, alkaline metallic silicate and platinum catalyst.

As another treating agent, it may list as follows.

Namely, there are oxides belonging to a group I, II, III or IV in a periodic table, such as NaO, $K_2O$, CaO, MgO, CuO, $Ag_2O$, alumina, zirconium oxide or those in a compound including the said oxides which are shown with $(Mc_1)x(Mc_2)y(O)z$. $Mc_1$ is the element belonging to a group I, II or III, and $Mc_2$ is a group III of such as aluminum (Al), a group IV of such as carbon (C), silicon (Si), titanium (Ti), and zirconium (Zr), or a group V of such as phosphorus (P) and vanadium (V). The above mentioned 0 is oxide and x, y, z are integral numbers.

In the apparatus 4, a suitable clearance is arranged between the inlet 43 of the casing 41 and the fill-up section (shown with hatching) of the treating material 42 and the inlet obstructive plate 49 is arranged leaving a suitable distance from the inlet 41 and the fi 11-up section, and also the surrounding obstructive plates 50, 51 are provided in at least an upper portion of the fill-up section among the tipper portion, a middle portion between the top and bottom and a lower portion thereof to project into the fill-up section from the interior of the casing. In this embodiment, the surrounding obstructive plates 50, 51 are provided at the upper portion and the middle portion between the top and bottom.

The inlet obstructive plate 49 is neccessary to cover the inlet 43 of the casing 41 from the inside, but it is not neccessary to cover the inlet 43 entirely, but in this embodiment, it is formed to have a diameter greater than the inlet 43 so as to surely disperse the flow of the exhaust gas in radial directions from a center of the casing, which gas flows into the casing from the inlet 43.

Further, the shape of the inlet obstructive plate 49 is not limited specifically, but it is possible to form the plate in the shape of a star, multiangles or ellipse where these are seen from the inside of the inlet. However, in this embodiment, the plate is formed in a shape of a circle which is coaxial with the inlet in order to disperse the exhaust gas evenly.

Furthermore, the inlet obstructive plate 49 may be a solid plate such as a conical shape or a chrysanthemum-shaped metal fixture, but in this embodiment, the plate is formed with a flat plate in order to reduce the manufacturing cost by simplifying its shape.

By the way, with provision of the inlet obstructive plate 49, the exhaust gas that flows from the inlet 43 is dispersed, but since the interior of the casing 41 is flat, it tends to form a passage having a small flow resistance between the interior of the casing 41 and the harmful object treating material 42 rather than the passage formed in the harmful object treating material 42 . As the result, the exhaust gas flows between the interior of the casing and the harmful object treating material having a small flow resistance, and its treating efficiency of harmful objects goes down and the periphral portion of the fill-up section of the treating material may sometimes be broken or damaged easily within a short period of time.

Then, the surrounding obstructive plate 50 is provided in an upper portion of the fill-up section to project into the fill-up section from the interior of the casing 41, so that the flow of the exhaust gas along the inner periphery of the casing 41 can be guided into the harmful object treating material 42 of the fill-up section.

In this case, as shown in FIG. 1, it is preferable to dispose the surrounding obstructive plate 50 to be downwardly inclined from the base end thereof toward the tip end thereof so as to control the flow of the exhaust gas toward the inside of the treating material. Particularly, in FIG. 1, the angle $\alpha$ is set to be within 15– 80 degrees, preferably within 30–60 degrees. In this embodiment, the angle is set to be 45 degrees.

Where the angle $\alpha$ is less than 15 degrees, the function of the surrounding obstructive plate 50 becomes poor. Contrary to this, where the angle exceeds 80 degrees, it is not preferable since the plate tends to prevent the flow of the exhaust gas.

Further, the surrounding obstructive plate 51 functioning as a reinforced rib, is fixed to the inner periphery of the casing 41 at a middle portion of the fill-up section for the harmful object treating material. Thus, the surrounding obstructive plate 51 is given the same function of the upper surrounding obstructive plate 50.

In the apparatus, the flow of the exhaust gas that flows from the inlet 43 is dispersed radially in the casing 41 as the exhaust gas strikes the inlet obstructive plate 49 and is guided thereby. Since there is a suitable distance between the inlet obstructive plate 49 and the fill-up section, a part of the exhaust gas dispersed radially, flows into the reverse side of the inlet obstructive plate 49, so that the exhaust gas may flow through the entire fill-up section evenly.

As the result, it becomes possible to contact the exhaust gas and the entire harmful object treating material 42, and its treating efficiency may be increased. Further, it may prevent a part of the harmful object treating material 42 from deteriorating and its life span of time can be extended.

Further, on the side of the outlet of the harmful object treating material, the fill-up section for the treating material is supported to be floatable from the punched plate 47 by means of the frame 48. Therefore, the greatest portion of the passage formed in the fill-up section is not closed with the unpunched portion of the punched plate 47, and rather opened between the clearances or meshes of the frame 48 and gathered, so that the exhaust gas cannot be blocked partly in the fill-up section so as to flow evenly through the entire harmful object treating material of the fill-up section.

As the result, it becomes possible for the exhaust gas to contact the harmful object treating material 42 evenly and therefore, it may prevent a part of the harmful object treating material 42 from deteriorating and its life span of time can be extended. Further, in combination of these functions, with a small amount of the harmful object treating material, it becomes possible to obtain a treating ability greater than the conventional apparatus. Where the amount of the harmful object treating material is the same as the conventional apparatus, its effective treating time has been extended about 50–100 times of the conventional apparatus.

In this embodiment, since the exhaust gas flows into the casing 41 from the upper portion thereof, it does not tend to lift the harmful object treating material due to the pressure of the exhaust gas. Even if the exhaust gas flows into the casing 41 from the lower portion thereof by changing the outlet 44 and the inlet 43, there is no problem since the harmful object treating material is prevented from rising by means of the surrounding obstructive plate 51 at a middle portion of top and bottom of the casing and the surrounding obstructive plate 50 at the upper portion thereof.

Figure 3:
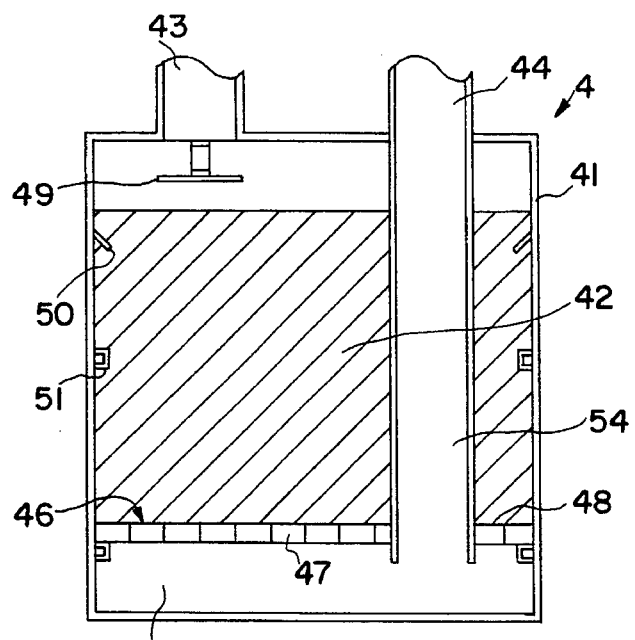
FIG. 3 is a sectional view of the apparatus of another embodiment of this invention.

FIG. 3 shows another embodiment of the apparatus for removing the harmful objects according to the present invention. In each of the apparatuses as mentioned above, this embodiment provides an inlet 43 at an end of the casing and an outlet 44 at the same end of the casing instead of providing the inlet 43 at the end of the casing and the outlet 44 at another end of the casing, and also provides a passage 54 which communicates with the side of outlet 53 of the fill-up section and the outlet 44 of the end of the casing. As the result, in addition to the advantages obtained in each of the above mentioned apparatuses, it becomes possible to minimize its installation space and it becomes easy to install each of the apparatuses since it may be simply set on the surface of the installation space.

By the way, as shown in FIG. 3, it is not always neccessary to arrange the inlet obstructive plate 49 at a center of the casing 41. Namely, even if such a construction is adopted, the flow of the exhaust gas from the inlet 43 is contacted with the inlet obstructive plate 49 and then dispersed radially, and the exhaust gas flows evenly through the entire end area of the fill-up section due to the flow resistance of the treating material.

The apparatus according to the present invention is not limited to the above mentioned embodiments, and it is possible to modify the apparatus to take any kind of variation by combining each of the elements of this invention unless it deviates from the technical idea of this invention. Further, where the apparatus is used, more than two apparatuses may be combined, for example, in series or parallel, so that removal of the harmful objects may be surely carried out, or may be used for a long time.

FUNCTION

The apparatus of removing the harmful objects according to the invention has such a function that the exhaust gas including the harmful objects flow through the entire fill-up section for the treating material so as to effectively contact the exhaust gas and the harmful object treating material by providing the inlet obstructive plate and the surrounding obstructive plate; provided in at least an upper portion of the fill-up section among the upper portion, a middle portion between the top and bottom and a lower portion thereof to project into the fill-up section from the interior of the casing.

The apparatus of removing the harmful object according to the invention has the following function. Namely, since the apparatus provides the supporting plate for the harmful object treating material arranged at the lower portion of the casing and the supporting plate comprises the punched plate and the frame projecting upwardly from the punched plate, the greatest portion of the passage formed in the fill-up section is not closed with the unpunched portion of the punched plate, and then opened between the clearances or meshes of the frame and gathered (effect of gathering passages), so that the flow-in of the exhaust gas into the fill-up section or the flow-out of the exhaust gas from the fill-up section cannot be blocked partly. As the result, the exhaust gas can be evenly flown through the entire fill-up section.

The apparatus of removing the harmful objects according to the invention has such a function that the exhaust gas including the harmful objects may flow through the entire fill-up section for the treating material so that the exhaust gas will effectively contact the harmful object treating material by particularly providing the inlet obstructive plate at the inlet of the casing to cover the inlet from the inside and the supporting plate comprising the punched plate and the frame projecting upwardly from the punched plate.

The apparatus of removing the harmful objects according to the invention has such a function that the exhaust gas including the harmful objects may flow through the entire fill-up section for the treating material so that the exhaust gas will effectively contact the harmful object treating material by particularly providing the surrounding obstructive plate provided in at least an upper portion of the fill-up section among the upper portion, a middle portion between the top and bottom and a lower portion thereof to project into the fill-up section from the interior of the casing, and also the supporting plate disposed at a lower portion of the casing to support the harmful object treating material, said supporting plate being provided with a punched plate and a frame projecting from an upper surface of the punched plate upwardly.

The apparatus of removing the harmful object according to the invention has such a function that the exhaust gas including the harmful objects may flow through the entire fill-up section for the treating material so as to effectively contact the exhaust gas and the harmful object treating material by particularly providing the inlet obstructive plate provided at the inlet for covering the inlet from the inside of the casing, the surrounding obstructive plate provided in at least an upper portion of the fill-up section among the upper portion, a middle portion between the top and bottom and a lower portion thereof to project into the fill-up section from the interior of the casing, and the supporting plate disposed at a lower portion of the casing to support harmful object treating material, said supporting plate being provided with a punched plate and a frame projecting from an upper surface of the punched plate upwardly.

What is claimed is:

1. An apparatus for removing harmful objects comprising:

a cylindrical casing having an inlet at one end thereof and an outlet thereof, a fill-up section in said casing for a granular or lump treating material for adsorbing or resolving said harmful objects, an inlet obstructive plate means within said casing and spaced from the inlet for covering an area corresponding to the inlet from an inside of the casing, and a surrounding obstructive plate means provided in at least an upper portion of the fill-up section among the upper portion, a middle portion between the top and bottom and a lower portion thereof to project into the fill-up section from an interior of the casing.

2. The apparatus for removing the harmful objects as defined in claim 1, further comprising:

a supporting plate means disposed at a lower portion of the casing to support a harmful object treating material, said supporting plate being provided with a punched plate and a frame projecting upwardly from an upper surface of the punched plate.

3. The apparatus for removing the harmful objects as defined in claim 2, wherein said inlet is provided at said one end of the casing and said outlet is provided at the same said one end of the casing, and a passage is communicated with an outlet side of the fill-up section and the said outlet of the casing.

4. The apparatus for removing the harmful objects as defined in claim 1, wherein said inlet is provided at said one end of the casing and said outlet is provided at the same said one end of the casing, and a passage is communicated with an outlet side of the fill-up section and the said outlet of the casing.

5. An apparatus for removing harmful objects comprising:

a cylindrical casing having an inlet at one end thereof and an outlet thereof, a fill-up section for a granular or lump treating material for adsorbing or resolving said harmful objects, and a supporting plate means disposed at a lower portion of the casing to support a harmful object treating material within said casing, said supporting plate being provided with a punched plate and a frame projecting upwardly from an upper surface of the punched plate.

6. The apparatus for removing the harmful objects as defined in claim 5, wherein said inlet is provided at said one end of the casing and said outlet is provided at the same said one end of the casing, and a passage is communicated with an outlet side of the fill-up section and the said outlet of the casing.

7. An apparatus for removing harmful objects comprising:

a cylindrical casing having an inlet at one end thereof and an outlet thereof, a fill-up section for a granular or lump treating material for adsorbing or resolving said harmful objects, an inlet obstructive plate means provided at the inlet within said casing for covering an area corresponding to the inlet from the inside of the casing, and a supporting plate means disposed at a lower portion of the casing to support a harmful object treating material, said supporting plate being provided with a punched plate and a frame projecting upwardly from an upper surface of the punched plate.

8. The apparatus for removing the harmful object as defined in claim 7, wherein said inlet is provided at said one end of the casing and said outlet is provided at the same said one end of the casing, and a passage is communicated with an outlet side of the fill-up section and the said outlet of the casing.

9. An apparatus for removing harmful objects comprising:

a cylindrical casing having an inlet at one end thereof and an outlet thereof, a fill-up section for a granular or lump treating material for adsorbing or resolving said harmful objects, a surrounding obstructive plate means provided in at least an upper portion of the fill-up section among an upper portion, a middle portion between a top and bottom and a lower portion thereof which projects into the fill-up section from an interior of the casing, and a supporting plate means disposed at a lower portion of the casing to support a harmful object treating material, said supporting plate being provided with a punched plate and a frame projecting upwardly from an upper surface of the punched plate.

10. The apparatus for removing the harmful objects as defined in claim 9, wherein said inlet is provided at said one end of the casing and said outlet is provided at the same said one end of the casing, and a passage is communicated with an outlet side of the fill-up section and the said outlet of the casing.

* * * * *